UNITED STATES PATENT OFFICE.

EDWARD T. PELTON, OF CHICAGO, ILLINOIS.

PROCESS OF MAKING STEEL.

1,376,160. Specification of Letters Patent. Patented Apr. 26, 1921.

No Drawing. Application filed July 6, 1920. Serial No. 394,228.

*To all whom it may concern:*

Be it known that I, EDWARD T. PELTON, a citizen of the United States, residing at Chicago, in the county of Cook and State of Illinois, have invented certain new and useful Improvements in Processes of Making Steel, of which the following is a specification.

The process of the present invention is related in a measure to the process set forth in Patent No. 1,315,034, issued September 2, 1919, and the objects of the present invention, like those set forth in the above patent are to produce a steel of finer texture having more perfect physical property than steel produced in accordance with the usual and well known methods. The present invention however, differs from that set forth in Patent No. 1,315,034, in that the foregoing patent pertains to a process which is employed primarily for the treatment of iron materials having a relatively large content of sulfur and phosphorus in which treatment the use of a basic lined furnace is required and special provision must be made, by the addition of suitable ingredients, to insure the removal of the sulfur and phosphorus. I have found that where the iron materials to be treated are low in content of sulfur and phosphorus, that they may be reduced in an acid lined furnace and the process of the present invention is directed to the treatment of such materials in an acid lined furnace, preferably one lined with a composition of silica.

The reason why it is not feasible to employ an acid lined furnace for use in the reducing of iron materials having a high content of sulfur and phosphorus is that these substances tend to unite with the silica or other acid lining and cause disintegration of the furnace structure, but where the content of such material is relatively low the process of the present invention may be successfully practised.

In describing the steps by which the intended results are obtained, it is the intention to specify the proportions of the ingredients and the details of the process with sufficient particularity to enable one skilled in the art to practise the invention, but it is recognized that these proportions and details may be modified within reasonable limits and it is not therefore the intention to confine the claims to the precise proportions and details set forth, unless otherwise specified. The proportions and figures hereinafter to be given relate to the proportions per ton of 2,000 pounds of iron material used in the original charge, which iron material may be furnished by scrap material or from ore or pig iron or from any desired mixture of any or all of these ingredients.

The furnace employed may be an open hearth furnace having an acid lining of silica or other like materials and for purposes of illustrating, we will assume that a charge of 2,000 pounds of iron materials having a low content of sulfur and phosphorus is employed. After the contents of the furnace have been reduced to a molten condition the slag comprising dirt or other free materials is skimmed from the mass and approximately 40 pounds of metallic ore or concentrates of ore or any combination of ores or concentrates of ores such as manganese ore, cobalt ore, chromium ore, vanadium ore, tungsten ore, or the like are added. The molten mass is then thoroughly poled and the metal allowed to get to a high state of ebullition. When this ebullition has subsided the metal is withdrawn from the furnace. The addition of the ore or ores mentioned tends after the ebullition to form a coating or blanket on top of the metallic bath, which apparently has the effect of retaining the heat and preventing an access of atmospheric air, and it is believed that these conditions tend to produce the refining action to which the bath is subjected. The resulting steel possesses, in considerable degree, the physical properties of the high grade alloy steels, such as manganese steel, tungsten steel, or the like, without necessarily exhibiting any or more than a trace of such alloying materials. Steel produced by this process possesses physical characteristics which have heretofore been considered impossible of securing in a steel having the chemical analysis of that produced by the process set forth above. By the process of the present invention great economy is effected in the materials used in connection with the charge of ferro alloys in comparison with the use of metallic alloys of the character employed at the present time, and which are extremely costly and add very greatly to the cost of production of the various high grade steels at present on the market.

I claim:

1. The process of producing steel which consists in charging an acid lined furnace with iron materials low in phosphorus and sulfur, bringing the charge to a molten condition, removing the slag from the surface of the molten charge, adding metallic ore to the charge, causing ebullition in the charge, and withdrawing the charge from the furnace.

2. The process of producing steel which consists in charging an acid lined furnace with iron materials low in phosphorus and sulfur, bringing the charge to a molten condition, adding metallic ore to the charge, causing ebullition in the charge, and withdrawing the charge from the furnace.

3. The process of producing steel which consists in charging an acid lined furnace with iron materials low in content of phosphorus and sulfur, subjecting the charge to a reducing heat, adding metallic ore to the charge in the ratio of approximately forty pounds to the ton, thoroughly poling the charge to cause ebullition, and withdrawing the charge from the furnace.

4. The process of producing steel which consists in charging an acid lined furnace with iron materials low in content of phosphorus and sulfur, subjecting the charge to a reducing heat, removing the slag from the surface of the charge, adding metallic ore to the charge, poling the charge to produce ebullition, allowing formation of a coating or blanket on top of the charge, and finally removing the charge from the furnace, substantially as described.

EDWARD T. PELTON.